United States Patent [19]

Kress et al.

[11] 4,077,280

[45] Mar. 7, 1978

[54] TRANSMISSION

[75] Inventors: James Henry Kress, Cedar Falls; Richard Arlo Michael, Waterloo, both of Iowa

[73] Assignee: Deere & Company, Moline, Ill.

[21] Appl. No.: 752,744

[22] Filed: Dec. 21, 1976

[51] Int. Cl.² ............................................. F16H 57/10
[52] U.S. Cl. ........................................ 74/760; 74/761
[58] Field of Search ......................... 74/760, 761, 753

[56] References Cited

U.S. PATENT DOCUMENTS

| 1,217,059 | 2/1917 | Pollard | 74/761 |
| 1,231,529 | 6/1917 | Pollard | 74/761 |
| 2,599,559 | 6/1952 | Kelbel | 74/760 |
| 2,901,923 | 9/1959 | Waclawek | 74/761 X |
| 3,215,003 | 11/1965 | Gorshkoff | 74/760 |
| 3,857,303 | 12/1974 | Mouttet | 74/761 |

FOREIGN PATENT DOCUMENTS 995,233 6/1965 United Kingdom .................. 74/760

*Primary Examiner*—Samuel Scott
*Assistant Examiner*—Lance W. Chandler

[57] ABSTRACT

A planetary transmission for selectively shifting among four forward speeds includes a first ring gear secured to a drive shaft. The first ring gear drives a compound planetary gear set which is journaled on a driven-shaft-connected planet carrier. A first planet gear set of the compound planetary gear set meshes with a carrier-journaled, third planet gear set which meshes in turn with a second ring gear. The first planet gear set further meshes with a first sun gear which is concentric with the first ring gear and which encircles and is clutchable to the driven shaft to provide one forward speed ratio between drive and driven shafts. A second plane gear set of the compound planetary gear set meshes with a second sun gear which is coaxial with the first sun gear and concentric with the second ring gear. First, second, and third brakes are respectively connected to the second ring gear, the second sun gear, and the first sun gear to stop and allow rotation of said gears to provide three additional forward speeds.

11 Claims, 2 Drawing Figures

TRANSMISSION

BACKGROUND OF THE INVENTION

The present invention relates generally to vehicle power shift transmissions and more particularly to a planetary transmission which is capable of being shifted between four forward speeds.

In the past, a number of different planetary transmission arrangements have been developed to provide various speed ratios as exemplified by the U.S. Pat. No. 2,697,367 granted to M. P. Winther which provides four forward and one reverse speeds with three brakes and two clutches. The ultimate aim of these arrangements has been to provide a maximum number of speed ratios with a minimum number of control elements such as brakes and clutches.

SUMMARY OF THE INVENTION

The present invention provides a four forward speed planetary transmission requiring a minimum number of gears, brakes, and clutches. Yet another advantage is that shifting between all adjacent speeds of the transmission is accomplished by "single element shifting", in which one clutching element is engaged while another is being disengaged. A drive shaft is provided with a ring gear for driving a compund planetary gear set journaled on a planet carrier secured to a driven shaft. The compound planetary gear set is selectively rotated to drive the planet carrier by meshing with brake-associated first and second sun gears and by meshing with a single, planet gear set which meshes with a brake-associated ring gear. The compound planet gear set is selectively prevented from rotating relative to the other planetary gear members to provide a direct drive from the drive to the driven shafts by clutching the first sun gear to the driven shaft.

DESCRIPTION OF THE PREFERRED EMBODIMENT

Figure 1:
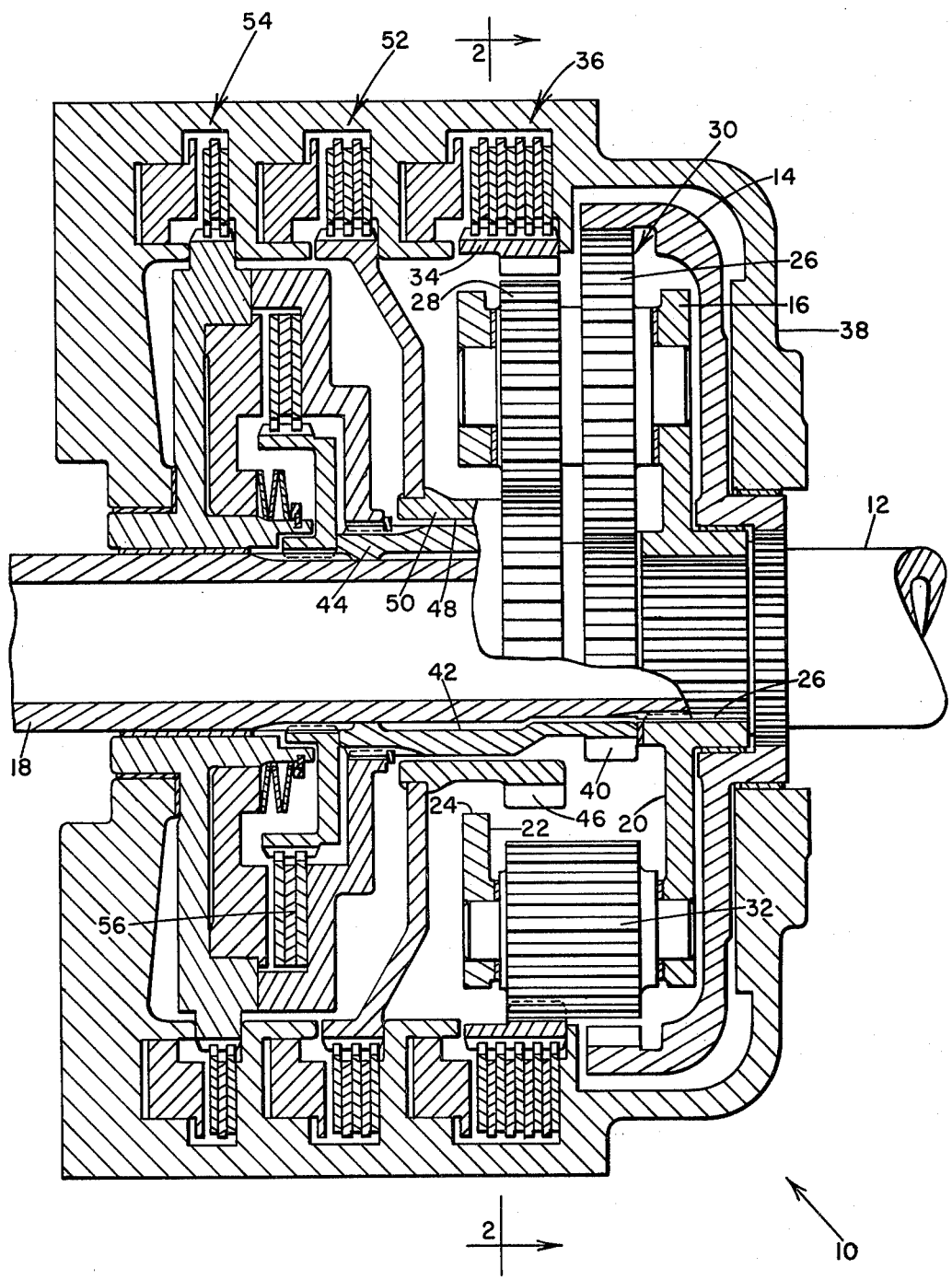
FIG. 1 is a diagrammatic longitudinal view, partially in section, of the planetary transmission of the present invention.

Referring now to FIG. 1, therein is shown a planetary transmission generally designated by the numeral 10. The transmission 10 is driven by a drive shaft 12 which is generally connected to an internal combustion engine (not shown). The drive shaft 12 is splined to a first ring gear 14 which partially envelops a planet carrier 16 which is splined to a driven shaft 18 which extends rearwardly from the forward portion of the planet carrier 16. The expressions "rearwardly" and "forward end" are used on the basis of a typical fore and aft disposition of the transmission in a vehicle; however, it will be realized that such expressions are used for purposes of convenience and not by way of limitation.

The planet carrier 16 has front and rear walls 20 and 22, respectively, with the rear wall 22 having a coaxial opening 24 and the forward wall 20 having a splined connection at 26 with the driven shaft 18. The carrier 16 has means rigidly interconnecting the front and rear walls 20 and 22, and this means includes several shafts, for carrying planet gears to be hereinafter described, together with circumferentially spaced wall portions.

Figure 2:
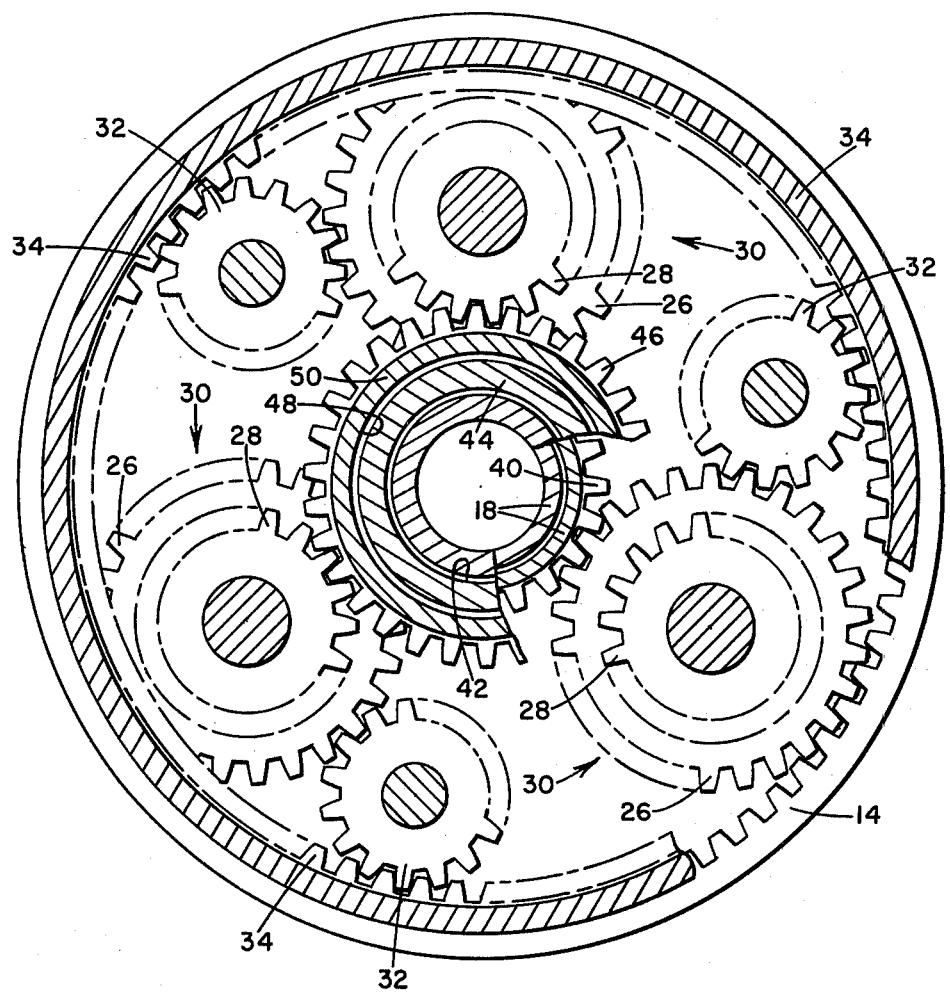
FIG. 2 is a cross-sectional view taken along the line 2—2 of FIG. 1.

The first ring gear 14 meshes with a first planet gear set 26 which in coaxial combination with an integral second planet gear set 28 forms a compound planet gear set which consists of three equilaterally spaced compound gears, each of which is generally designated by the numeral 30 as shown in FIG. 2. The first planet gear set 26 meshes with a third planet gear set 32 which consists of three equilaterally spaced gears journaled in the planet carrier 16. The third planet gear set 32 further meshes with and floatingly carries a second ring gear 34 which has associated therewith a first brake 36 for selectively braking and releasing the second ring gear 34 relative to a transmission housing 38. The first planet gear set 26 further meshes with a first sun gear 40 which has a central aperture 42 through which the driven shaft 18 extends. The first sun gear 40 further includes a shaft portion 44 which extends rearwardly therefrom. Encircling the shaft portion 44 is a second sun gear 46 having a central aperture 48. The second sun gear 46 meshes with the second planet gear set 28 and has a shaft portion 50 which is connected to a second brake 52.

The shaft portion 44 of the first sun gear 40 is connected to a third brake 54 which selectively brakes and releases the first sun gear 40 relative to the housing 38. Coaxial with the third brake 54 is a clutch 56 for selectively coupling and uncoupling the driven shaft 18 to and from the first sun gear 40.

From the description thus far, and noting that the drive shaft 12 may be connected to a power source such as an internal combustion engine by a clutch or other torque-transmitting mechanism, it will be seen that the drive shaft 12 may be regarded as a constantly rotating part.

A first forward speed is obtained by braking the first brake 36. The rotation of the driven shaft 12 is transmitted through the first ring gear 14 to the first planet gear set 26. The rotation of the first planet gear set 26 is transmitted to the third planet gear set 32 which begins to translate because of its engagement with the braked second ring gear 34. The translation of the third planet gear set 32 causes rotation of the planet carrier 16 and thus rotation of the driven shaft 18.

A second forward speed is obtained by braking the second brake 52. The rotation of the drive shaft 12 is transmitted through the first ring gear 14 to the compound planet gear set 30. Rotation of the compound planet gear set 30 causes translation thereof since the second planet gear set is engaged with the braked second sun gear 46. With translation of the compound planet gear set 30, the planet carrier 16 rotates to cause rotation of the driven shaft 18.

A third forward speed is obtained by braking the third brake 54. The rotation of the drive shaft 12 is transmitted through the first ring gear 14 to the first planet gear set 26. As the first planet gear set 26 rotates, it is caused to translate by its engagement with the braked first sun gear 40. Again translation of the compound planet gear set 30 causes rotation of the carrier 16 and the output shaft 18.

A fourth forward speed and direct drive is obtained by engaging the clutch 56. The engagement of the clutch 56 prevents relative movement between the first sun gear 40 and the carrier 16 and thus prevents relative rotation of the first planet gear 26. The rotation of the drive shaft 12 is transmitted through the first ring gear 14 to cause translation of the first planet gear set 26 and thus of the carrier 16 which rotates the driven shaft 18 at the same speed as the driven shaft 12.

Therefore, a planetary transmission is shown which provides four forward speeds with three brakes and one clutch. As evident to those skilled in the art, the number of teeth selected for each of the gears is chosen so as to provide four different speed ratios.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. A transmission comprising: a drive shaft, a driven shaft; first and second planetary units having a rotatable planet carrier secured to the driven shaft; said first planetary unit including a first rotatable ring gear secured to the drive shaft; a first sun gear encircling the driven shaft and concentric with the first ring gear, a first planet gear journaled in the planet carrier meshing with the first ring gear and the first sun gear, and a second planet gear integral with the first planet gear and coaxial therewith; said second planetary unit including a second sun gear encircling the driven shaft and axially spaced from the first sun gear, a second rotatable ring gear concentric with said second sun gear, and a third planet gear journaled in the planet carrier meshing with the first planet gear and the second ring gear; first, second, and third brake means for selectively braking and releasing the second ring gear, the second sun gear and the first sun gear, respectively, whereby the driven shaft is rotatable at three different forward ratios with respect to the drive shaft.

2. The transmission as claimed in claim 1 including clutch means for selectively coupling and releasing the driven shaft and the first sun gear whereby the driven shaft is rotatable at an additional different forward ratio.

3. The transmission as claimed in claim 1 wherein the driven shaft, the planet carrier, and the driven shaft are coaxial on a fore and aft axis, the second planetary unit is coaxially behind the first planetary unit, the first sun gear is axially hollow and includes a hollow portion with the driven shaft extending coaxially therethrough, and the third brake means is connected to one end of the hollow shaft portion.

4. The transmission as claimed in claim 3 wherein the second sun gear is axially hollow and includes a hollow portion with the hollow portion of the first sun gear extending axially therethrough, and the second brake means connected to one end of the hollow portion of the second sun gear.

5. The transmission as claimed in claim 4 including clutch means for selectively coupling and releasing the driven shaft and the first sun gear whereby the driven shaft is rotatable at an additional different forward ratio and wherein the hollow portion of the first sun gear includes the clutch means proximate the third brake means and axially spaced rearwardly of the planet carrier.

6. A transmission comprising: a drive shaft; a driven shaft; first and second planetary units having a rotatable planet carrier secured to the driven shaft; said first planetary unit including a first rotatable reaction gear secured to the drive shaft; a first driven gear encircling the driven shaft and concentric with the first reaction gear, a first planet gear journaled in the planet carrier meshing with the first reaction gear and the first driven gear, and a second planet gear integral with the first planet gear and coaxial therewith; said second planetary unit including a second driven gear encircling the driven shaft and axially spaced from the first driven gear, a second rotatable reaction gear concentric with said second driven gear, and a third planet gear journaled in the planet carrier meshing with the first planet gear and the second reaction gear; first, second and third brake means for selectively braking and releasing the second reaction gear, the second driven gear and the first driven gear, respectively, whereby the driven shaft is rotatable at three different forward ratios with respect to the drive shaft.

7. The transmission as claimed in claim 6 including clutch means for selectively coupling and releasing the driven shaft and the first driven gear whereby the driven shaft is rotatable at an additional different forward ratio.

8. The transmission as claimed in claim 6 wherein the driven shaft, the planet carrier, and the driven shaft are coaxial on a fore and aft axis, the second planetary unit is coaxially behind the first planetary unit, the first driven gear is axially hollow and includes a hollow portion with the driven shaft extending coaxially therethrough, and the third brake means is connected to one end of the hollow shaft portion.

9. The transmission as claimed in claim 8 wherein the second driven gear is axially hollow and includes a hollow portion with the hollow portion of the first driven gear extending axially therethrough, and the second brake means connected to one end of the hollow portion of the second driven gear.

10. The transmission as claimed in claim 9 including clutch means for selectively coupling and releasing the driven shaft and the first driven gear whereby the driven shaft is rotatable at an additional different forward ratio and wherein the hollow portion of the first driven gear includes the clutch means proximate the third brake means and axially spaced rearwardly of the planet carrier.

11. A planetary transmission comprising: a single planet carrier rotatable on a fore and aft axis and having spaced apart front and rear walls and means rigidly interconnecting said walls and having openings provided therein exposing the interior of said carrier radially outwardly; a centrally apertured first sun gear within the carrier just behind the front wall; a centrally apertured second sun gear coaxial with the first sun gear within the carrier just forwardly of the rear wall; first brake means for selectively braking and releasing the second sun gear; first and second relatively rotatable ring gears encircling the carrier and respectively concentric with the first and second sun gears; second brake means for selectively braking and releasing the second ring gear; a first planet gear journaled in the carrier meshing with the first sun gear and the first ring gear via at least one of the aforesaid openings; a second planet gear integral with the first planet gear and meshing with the second sun gear; a third planet gear journaled in the carrier meshing with the first planet gear and the second ring gear via at least one of the aforesaid openings; a drive shaft including a portion partially enveloping the carrier and secured to the first ring gear; and a driven shaft extending coaxially through the first and second sun gears and the carrier rear wall and secured to the carrier; and clutch means rearwardly of the rear wall for selectively coupling the first sun gear to the driven shaft.

* * * * *

UNITED STATES PATENT OFFICE
CERTIFICATE OF CORRECTION

Patent No. 4,077,280       Dated 7 March 1978

Inventor(s) James Henry Kress and Richard Arlo Michael

It is certified that error appears in the above-identified patent and that said Letters Patent are hereby corrected as shown below:

Column 3, line 40, delete "driven" (first occurrence) and insert --drive--.

Signed and Sealed this

Eighth Day of August 1978

[SEAL]

Attest:

RUTH C. MASON
Attesting Officer

DONALD W. BANNER
Commissioner of Patents and Trademarks